(12) United States Patent
Yang

(10) Patent No.: US 11,161,232 B2
(45) Date of Patent: Nov. 2, 2021

(54) ANGLE GRINDER, AIR BLOWER, AND POWER TOOL

(71) Applicant: Nanjing Chervon Industry Co., Ltd., Nanjing (CN)

(72) Inventor: Qingsong Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 340 days.

(21) Appl. No.: 16/451,774

(22) Filed: Jun. 25, 2019

(65) Prior Publication Data

US 2020/0001447 A1    Jan. 2, 2020

(30) Foreign Application Priority Data

Jun. 29, 2018  (CN) .......................... 201810695461.3
Nov. 29, 2018  (CN) .......................... 201811443113.3
Nov. 29, 2018  (CN) .......................... 201811443951.0

(51) Int. Cl.
| | |
|---|---|
| *H02K 9/06* | (2006.01) |
| *B25F 5/00* | (2006.01) |
| *H02K 9/02* | (2006.01) |
| *H02K 9/22* | (2006.01) |
| *B24B 23/02* | (2006.01) |

(52) U.S. Cl.
CPC .............. *B25F 5/008* (2013.01); *H02K 9/02* (2013.01); *H02K 9/22* (2013.01); *B24B 23/02* (2013.01)

(58) Field of Classification Search
CPC .. H02K 9/06; H02K 9/18; H02K 5/18; H02K 5/20; H02K 1/32
See application file for complete search history.

(56) References Cited

U.S. PATENT DOCUMENTS

| | | | | | |
|---|---|---|---|---|---|
| 1,504,622 | A | * | 8/1924 | Hellmund | ................ H02K 9/00 310/63 |
| 3,413,499 | A | * | 11/1968 | Barton | ..................... H02K 9/18 310/58 |
| 4,554,472 | A | * | 11/1985 | Kumatani | ............ H02K 7/1025 310/266 |
| 4,682,064 | A | * | 7/1987 | Crounse | ................... H02K 9/18 310/61 |
| 7,750,515 | B1 | * | 7/2010 | Gabrys | .................... H02K 9/08 310/61 |
| 2013/0200733 | A1 | | 8/2013 | Lau | |

* cited by examiner

*Primary Examiner* — Dang D Le
(74) *Attorney, Agent, or Firm* — Greenberg Traurig, LLP

(57) ABSTRACT

A power tool includes a housing, a tool attachment, an output shaft, an electric motor, and an airflow channel. The housing includes an air inlet and an air outlet, and an airflow channel is formed between the air inlet and the air outlet. The electric motor includes an electric motor shaft, a stator and a rotor. The power tool further includes a thermal conduction member disposed between the rotor and the stator and configured to transfer heat between the rotor and the stator into the airflow channel. Further disclosed is an angle grinder. The power tool has good heat dissipation performance.

20 Claims, 12 Drawing Sheets

ANGLE GRINDER, AIR BLOWER, AND POWER TOOL

RELATED APPLICATION INFORMATION

This application claims the benefit of CN 201810695461.3, filed on Jun. 29, 2018, CN201811443951.0, filed on Nov. 29, 2018, and CN 201811443113.3, filed on Nov. 29, 2018, the disclosures of which are incorporated herein by reference in their entirety.

TECHNICAL FIELD

The present disclosure relates to the field of power tools, and more particularly relates to an angle grinder, an air blower and a power tool.

BACKGROUND

There may be relatively thick dust or metal debris in the operating environments of some existing power tools, which may easily affect the use of power tools. Examples of power tools include grinding tools such as angle grinders, sanders, and garden tools such as air blowers. Taking the angle grinder as an example, in an existing angle grinder, a power supply is used to supply power to a driving circuitry, which then drives an electric motor to run at a high speed thereby driving the disc to perform grinding, cutting, and polishing operations on a workpiece. When working on a metal, especially on an iron workpiece, the disc of the angle grinder during its operation will produce a large amount of metal debris scattered in the space where the angle grinder is situated. In another respect, angle grinders, especially high-power angle grinders, are bound to heat up during operation. For heat dissipation purposes, the housing must be provided with a vent to allow external air into the housing for heat dissipation for the internal electronic components. During this heat dissipation process, metal debris scattered in the space will simultaneously enter the interior of the angle grinder through the vent. The metal debris entering the interior of the angle grinder can be easily absorbed and attach to the pins of the electronic components under the influence of the energization states of electronic component switches and current changes, forming an electrical path between the pins of the electronic components. Alternatively, the metal debris may be attached to the stator or rotor of the electric motor or attached to the gap between the stator and the rotor by attraction of a magnetic field generated by the stator and rotor. As a result, the electronic components are extremely susceptible to short circuits due to the electrical paths formed by the metal debris, and the stator and rotor of the electric motor are also easily blocked by the inhaled metal debris such that the rotor may be stalled.

Therefore, the angle grinders in the prior art, especially angle grinders with a brushless electric motor, are intended to seal the electric motor structure to avoid the influence of metal debris present in the space on the electric motor circuits. However, after sealing, the heat generated during the operation of the winding coil of the electric motor will accumulate inside the sealed structure of the electric motor. Thus, the accumulated high temperature will demagnetize the magnetic materials in the electric motor, causing the electric motor to fail. This failure process is irreversible. Therefore, there is a need for a method to solve the technical contradiction between the sealing and heat dissipation of the electric motor.

SUMMARY

In order to solve the deficiencies of the prior art, an object of the present disclosure is to provide a solution to the technical contradiction between electric motor sealing and heat dissipation in a power tool to protect the electric motor and prolong the service life of the power tool.

To achieve the above-mentioned object, the present disclosure provides the following solutions.

There is provided an angle grinder that includes a housing comprising an air inlet and an air outlet, an output shaft configured for supporting a grinding disc, an electric motor, accommodated in the housing and including an electric motor shaft, a stator and a rotor, and the electric motor shaft is operative to be connected to the output shaft to drive the output shaft to rotate thereby driving the grinding disc to rotate, and the electric motor shaft is operative to be connected to and driven by the rotor, and an airflow channel, located inside the housing and defined between the air inlet and the air outlet, and the airflow enters via the air inlet and is discharged by the air outlet. The angle grinder further includes a thermal conduction member, which is disposed at least between the rotor and the stator and extends toward the airflow channel to conduct heat between the rotor and the stator into the airflow channel.

Optionally, the angle grinder further includes a seal member, disposed in the electric motor and including a seal strip axially disposed between the stator and the rotor and/or a seal ring circumferentially disposed between the stator and the rotor.

Optionally, the stator surrounds the rotor. A first gap is defined between the rotor and the stator, and the stator defines a second gap. The thermal conduction member is disposed between the rotor and the stator to conduct heat in the first gap to the second gap. The second gap is located in the airflow channel and the airflow flows through the second gap.

Optionally, the stator includes a stator core, which includes a main body and a plurality of teeth extending radially inward from the main body. The plurality of teeth includes a winding arm connected to the main body. A winding groove is defined between adjacent winding arms, where the winding groove forms the second gap.

Optionally, the stator further includes a winding coil and an insulating frame. The insulating frame at least covers the stator core. The winding coil is wound around the insulating frame. At least part of the insulating frame is disposed between the rotor and the stator. The thermal conduction member is mounted on the portion of the insulating frame between the rotor and the stator.

Optionally, the thermal conduction member includes a thermal conduction portion and a mounting portion connected to the thermal conduction portion. The mounting portion is configured for mounting the thermal conduction member on the stator or the insulating frame. The thermal conduction portion extends toward the airflow channel, and at least the thermal conduction portion is made of a thermal conductive material.

Optionally, the angle grinder further includes a fan, accommodated in the housing and mounted on the electric motor shaft, wherein the fan is driven by the electric motor shaft to drive the airflow into motion.

There is further provided a blower that includes a housing comprising an air inlet and an air outlet, an electric motor, accommodated in the housing and including an electric motor shaft, a stator and a rotor, and the electric motor shaft is operative to be connected to and is driven by the rotor, a fan, operative to be connected with the electric motor shaft and driven by the electric motor to drive the airflow into motion, and an airflow channel, defined inside the housing and located between the air inlet and the air outlet, where the airflow enters via the air inlet and is discharged via the air outlet. The blower further includes a thermal conduction member, disposed at least between the rotor and the stator and extending toward the airflow channel, to conduct heat between the rotor and the stator into the airflow channel.

Optionally, the blower further includes a seal member, disposed in the electric motor and including a seal strip axially disposed between the stator and the rotor and/or a seal ring circumferentially disposed between the stator and the rotor.

Optionally, the stator surrounds the rotor. A first gap is defined between the rotor and the stator, and the stator defines a second gap. The thermal conduction member is disposed between the rotor and the stator to conduct heat in the first gap to the second gap. And the second gap is located in the airflow channel and the airflow flows through the second gap.

Optionally, the stator includes a stator core, the stator core including a main body and a plurality of teeth extending radially inward from the main body. The plurality of teeth include a winding arm connected to the main body. A winding groove is defined between adjacent winding arms, and the winding groove forms the second gap.

Optionally, the stator further includes an insulating frame and a winding coil. The insulating frame at least partially covers the stator core. The winding coil is wound around the insulating frame. At least part of the insulating frame is disposed between the rotor and the stator. The thermal conduction member is mounted on the portion of the insulating frame between the rotor and the stator.

Optionally, the thermal conduction member includes a thermal conduction portion and a mounting portion connected to the thermal conduction portion. The mounting portion is configured for mounting the thermal conduction member on the stator or the winding coil. The thermal conduction portion extends toward the airflow channel, and at least the thermal conduction portion is made of a thermal conductive material.

There is further provided a power tool that includes a housing comprising an air inlet and an air outlet, a tool attachment configured for implementing the function of the power tool, an output shaft for supporting a grinding disc, an electric motor, accommodated in the housing and operatively connected to the output shaft to drive the tool attachment to operate, the electric motor including an electric motor shaft, a stator and a rotor, and the electric motor shaft is operative to be connected to the output shaft to drive the output shaft to rotate, and the electric motor shaft is operative to be connected to and driven by the rotor, and an airflow channel, located inside the housing and defined between the air inlet and the air outlet, and the airflow enters via the air inlet and is discharged by the air outlet. The angle grinder further includes a thermal conduction member, which is at least disposed between the rotor and the stator and extends toward the airflow channel to conduct heat between the rotor and the stator into the airflow channel.

Optionally, the blower further includes a seal member, disposed in the electric motor and including a seal strip axially disposed between the stator and the rotor and/or a seal ring circumferentially disposed between the stator and the rotor.

Optionally, the stator surrounds the rotor. A first gap is defined between the rotor and the stator, and the stator defines a second gap. The thermal conduction member is disposed between the rotor and the stator to conduct heat in the first gap to the second gap. The second gap is located in the airflow channel and the airflow flows through the second gap.

Optionally, the stator further includes a stator core, which includes a main body and a plurality of teeth extending radially inward from the main body. The plurality of teeth includes a winding arm connected to the main body. A winding groove is defined between adjacent winding arms, where the winding groove forms the second gap.

Optionally, the stator further includes an insulating frame and a winding coil. At least part of the insulating frame covers the stator core. The winding coil is wound around the insulating frame. At least part of the insulating frame is disposed between the rotor and the stator. The thermal conduction member is mounted on the portion of the insulating frame between the rotor and the stator.

Optionally, the thermal conduction member includes a thermal conduction portion and a mounting portion connected to the thermal conduction portion. The mounting portion is configured for mounting the thermal conduction member on the stator or on the insulating frame. At least the thermal conduction portion is made of a thermal conductive material.

Optionally, the thermal conduction member is integrally formed.

In view of the foregoing, it will be appreciated that the subject devices have the advantageous benefits of using a thermal conduction member installed between the stator and the rotor of the motor in the power tool so that the heat inside the electric motor is transferred to the airflow channel via the thermal conduction member and heat of the electric motor is dissipated by the circulating airflow in the airflow channel to improve the heat dissipation efficiency of the electric motor, protect the motor, and prolong the service life of the motor.

DETAILED DESCRIPTION

The present disclosure will be described below in detail in conjunction with the drawings and specific implement modes.

The power tool of the present disclosure may be a hand-held power tool, a table tool, a garden tool, a garden vehicle such as a vehicle type lawn mower, but it is not limited thereto. The power tool of the present disclosure includes, but is not limited to: an angle grinder, a sander, etc., which may be used to grind a workpiece, and a reciprocating saw, a circular saw, a scroll saw, etc., which may be used to cut the workpiece. These tools may also be garden tools such as blowers, lawn mowers, weed mowers, chain saws, etc. and these tools may also be used for other purposes, such as mixers. As long as any power tool can employ the substance of the technical solutions disclosed below, it is to be considered as falling within the scope of protection of the present disclosure.

The present disclosure will be described below in detail in conjunction with the drawings and specific examples. Power tools include, but are not limited to: a housing, including an air inlet and an air outlet; an output shaft for supporting a tool attachment; an electric motor, accommodated in the housing and operatively connected to the output shaft to drive the tool attachment to operate, and the electric motor includes an electric motor shaft, a stator and a rotor; The electric motor shaft is operatively connected to the output shaft to drive the output shaft to rotate, and in some examples, the output shaft may be an electric motor shaft, and optionally, the power tool further includes a transmission mechanism, connecting the output shaft and the electric motor shaft; the electric motor shaft is connected to and driven by the rotor; an airflow channel, formed inside the housing and located between the air inlet and the air outlet, and the airflow enters via the air inlet and is discharged by the air outlet. The power tool further includes a thermal conduction member, disposed at least between the rotor and the stator and extending toward the airflow channel, to conduct heat between the rotor and the stator into the airflow channel, and heat of the electric motor is dissipated by the circulating airflow in the airflow channel. Different tools may have different tool attachments. For example, the tool attachment for the angle grinder 10 may be a grinding disc for chipping or grinding purposes, the tool attachment for the air blower 10 may be a fan that generates a blowing air flow, and the tool attachment for the sander may be a moving base plate.

Figure 1:
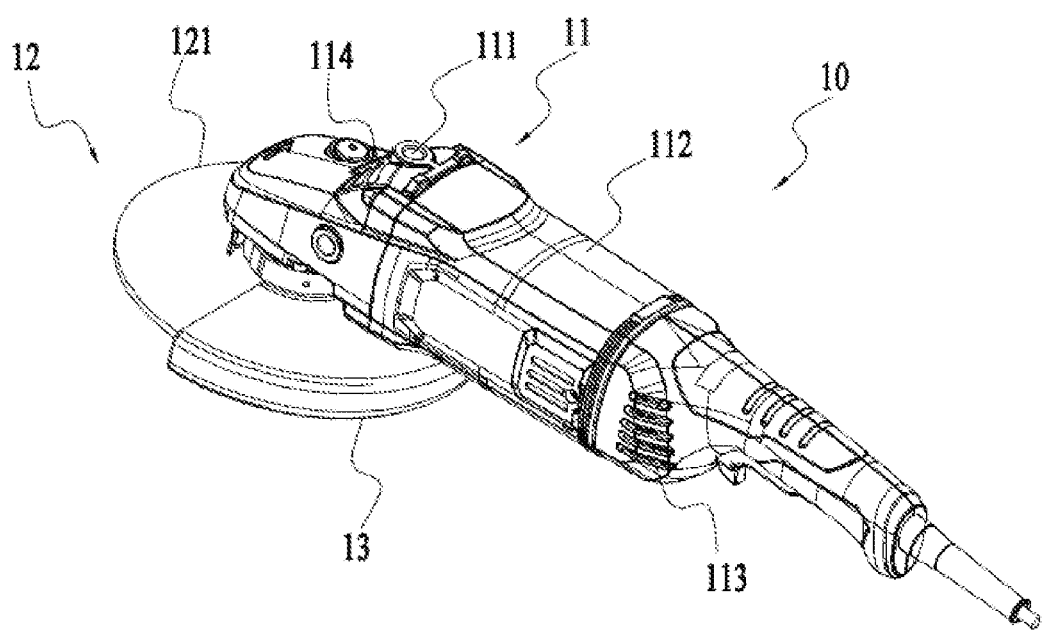
FIG. 1 is a schematic diagram illustrating an external structure of a power tool according to a first example.
Figure 2:
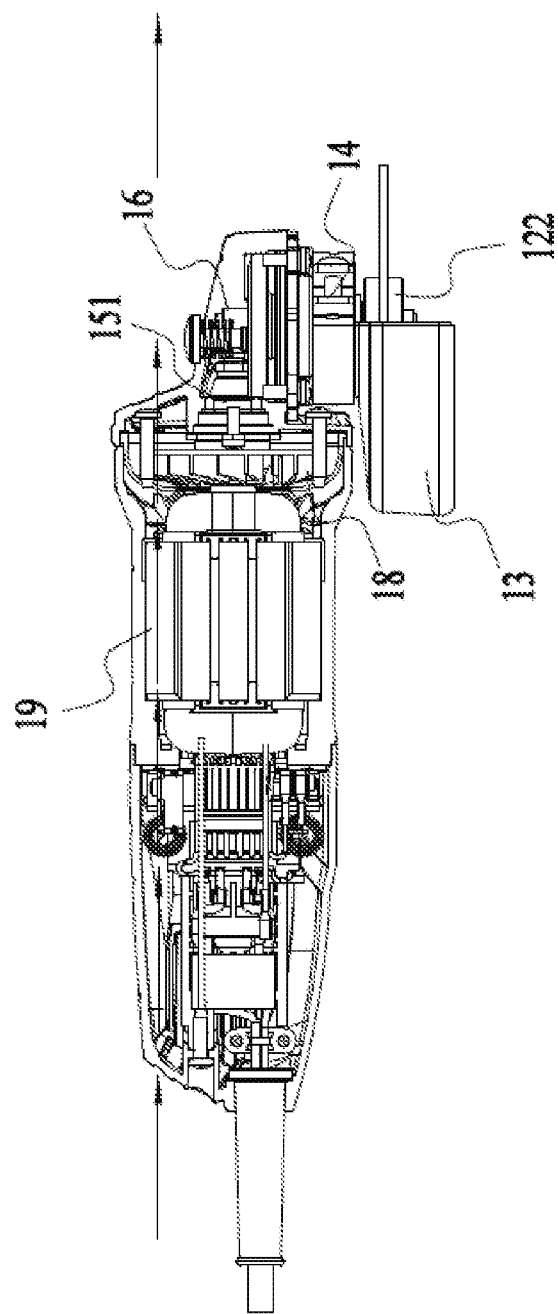
FIG. 2 is a schematic diagram illustrating a partial internal structure of the power tool according to the first example.

In a first example of the present disclosure, the power tool is exemplified by an angle grinder 10, and as illustrated in FIG. 1 and FIG. 2, the angle grinder 10 includes a housing 11, a grinding disc 12, a shield 13, an output shaft 14, and an electric motor 15 and a transmission mechanism 16.

The housing 11 includes a head casing 111 and a body casing 112, and is further provided with an air inlet 113 and an air outlet 114. The electric motor is accommodated in the housing 11 and, in particular, the electric motor 15 is fixed to the body casing 112. A housing 21 is further formed with a grip for the user to hold, and alternatively, the grip can of course be a separate component.

The grinding disc 12 is configured to achieve a grinding or cutting function. The angle grinder 10 further includes a shield 13 that at least partially overlies the grinding disc 12 for protection. The grinding disc 12 is installed on the output shaft 14 as the tool attachment to the angle grinder 10. The grinding disc 12 includes a disc 121 and a collet device 122. The collet device 122 is configured for mounting the grinding disc 12 to the output shaft 14, and the collet device 122 is disposed at one end of the output shaft 14 and is configured for gripping the grinding disc 12 and restricting the disc 121 within the shield 13.

The output shaft 14 is configured to mount or fix the tool attachment. For the angle grinder 10, the output shaft 14 is configured to mount the grinding disc 12 described above.

The electric motor 15, accommodated in the housing 11 and operatively and mechanically connected to the output shaft 14, is configured for driving the output shaft 14 to rotate, thereby driving the grinding disc 12 to operate. Specifically, the electric motor 15 includes a rotor 153, a stator 152, and an electric motor shaft 151. The rotor 153 is connected to the electric motor shaft 151 and is configured for driving the electric motor shaft 151 to rotate. The electric motor shaft 151 is operatively connected to the output shaft 14. In this example, the angle grinder 10 further includes the transmission mechanism 16 mounted to the head casing 111. The electric motor shaft 151 is connected to the output shaft 14 via the transmission mechanism 16, and the rotation of the electric motor shaft 151 is decelerated by the transmission mechanism 16 and is transmitted to the output shaft 14. The electric motor 15 may be a brush motor or a brushless motor, and may be an AC electric motor or a DC electric motor, or other types of electric motors, but it is not limited herein. For explanation purposes, herein the direction of the electric motor shaft 151 is defined as the axial direction, and the plane perpendicular to the electric motor shaft 151 is defined as the circumferential direction or the radial direction.

The transmission mechanism 16, connected to the output shaft 14 and the electric motor shaft 151, is configured for decelerating the rotation of the electric motor shaft 151 then outputting the decelerated rotation thereof. The transmission mechanism 16 may specifically include a retarding mechanism, such as a gear box or a retarding gear box. A first bevel gear and a second bevel gear, that are intended to mesh with each other, may be disposed in the gear box or the retarding gear box. The first bevel gear and the second bevel gear have different gear ratios. Alternatively, a timing belt transmission structure having different radii of synchronous wheels may be disposed in the retarding gear box.

The power supply of the angle grinder 10 can be a DC power source or an AC power source. The angle grinder 10 can be powered by the DC power source (for example, a battery pack), or can be powered by the AC power source and connected to an AC power source via a power line, which will however not be limited herein. In some examples, the angle grinder 10 may further include an operating switch for activating or deactivating the electric motor 15. The operating switch may be disposed at a surface of the housing 11 where the user may conveniently operate the same.

For angle grinders 10, especially the electronic components in high-power angle grinders, are bound to heat up during operation. For heat dissipation purposes, the housing 11 is provided with a vent to allow external air into the housing to dissipate heat from internal electronic device.

In this example, the housing 11 is provided with the air inlet 113 and the air outlet 114. An airflow channel 19 (i.e., an air passage) is defined between the air inlet 113 and the air outlet 114 and is formed inside the housing 11. The airflow enters inside of the housing 11 via the air inlet 113 of the housing 11 and flows through the electric motor 15 via the airflow channel 19, then flows out via the air outlet 114 of the housing 11. The direction of airflow in the airflow channel 19 is indicated by the arrow illustrated in in FIG. 2.

In some specific examples, it is to be understood that, when the angle grinder 10 is in operation, more debris, such as metal scraps or wood chips, will be generated in the vicinity of the grinding disc 12. Therefore, in order to avoid debris from entering the angle grinder 10 via the air inlet 113 as much as possible, the air inlet 113 may be disposed at an end away from the grinding disc 12, and the air outlet 114 may be disposed at an end adjacent to the grinding disc 12.

In order to enhance the heat dissipation effect, the angle grinder 10 may further include a fan 18, mounted on one end of the electric motor shaft 151, for dissipating heat inside the angle grinder 10. The rotor 153 of the electric motor 15 rotates to drive the electric motor shaft 151 to drive the fan 18 to operate, and the fan 18 then drives the air into motion to create a circulating airflow.

During the heat dissipation process, metal debris scattered in the space still inevitably enters inside of the housing 11 of the angle grinder 10 via the vent or other paths. The metal debris, especially the metal debris, entering the interior of the angle grinder 10 is easily absorbed by pins of the electronic device under the influence of the energization state of electronic device switches and current changes, forming an electrical path between the pins of the electronic device. Alternatively, the metal debris may be attached to the stator 152 or rotor 153 of the motor or attached to the gap between the stator 152 and the rotor 153 due to attraction by the magnetic field generated by the stator 152 and the rotor 153. As a result, the electronic components are extremely susceptible to short circuit due to the electrical path formed by the metal debris, and the stator 152 and rotor 153 of the electric motor can also be easily blocked by the inhaled metal debris such that the rotor may be stalled from rotating. Therefore, angle grinders 10 in the prior art, especially angle grinders 10 with a brushless electric motor, seal the electric motor structure to avoid the influence of metal debris in the space on the electric motor circuits.

Figure 3:
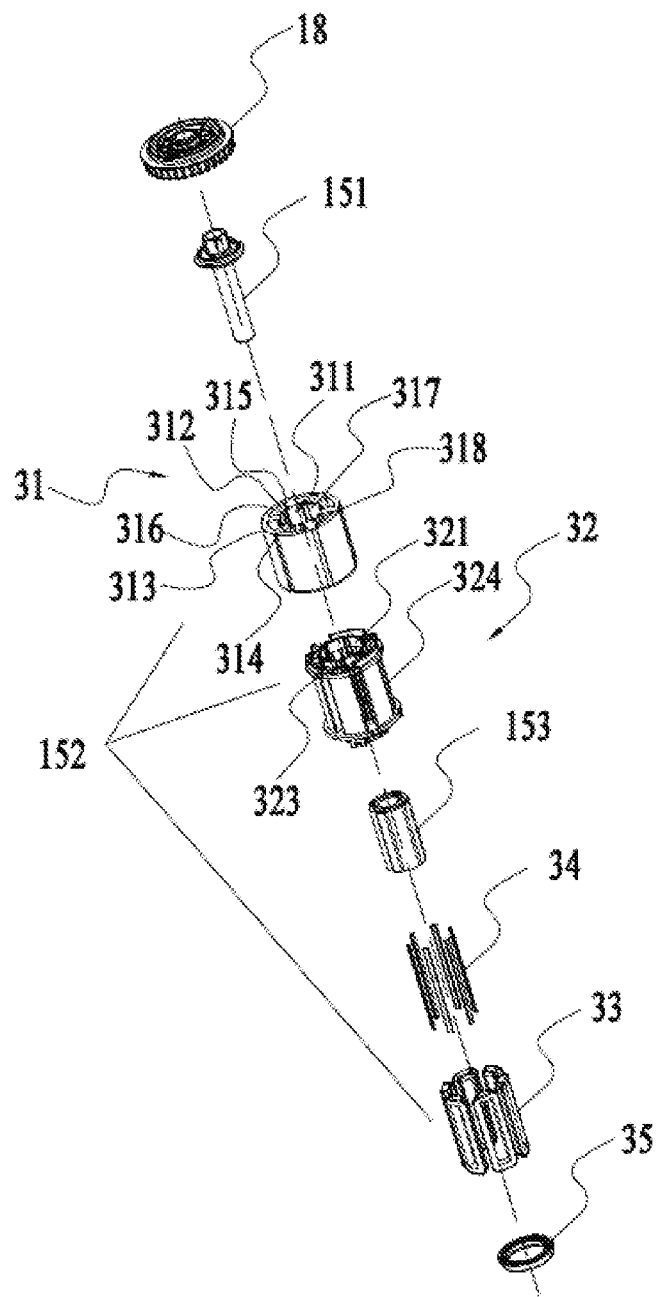
FIG. 3 is an exploded view illustrating an electric motor, a fan, and a seal member of the power tool according to the first example.
Figure 4:
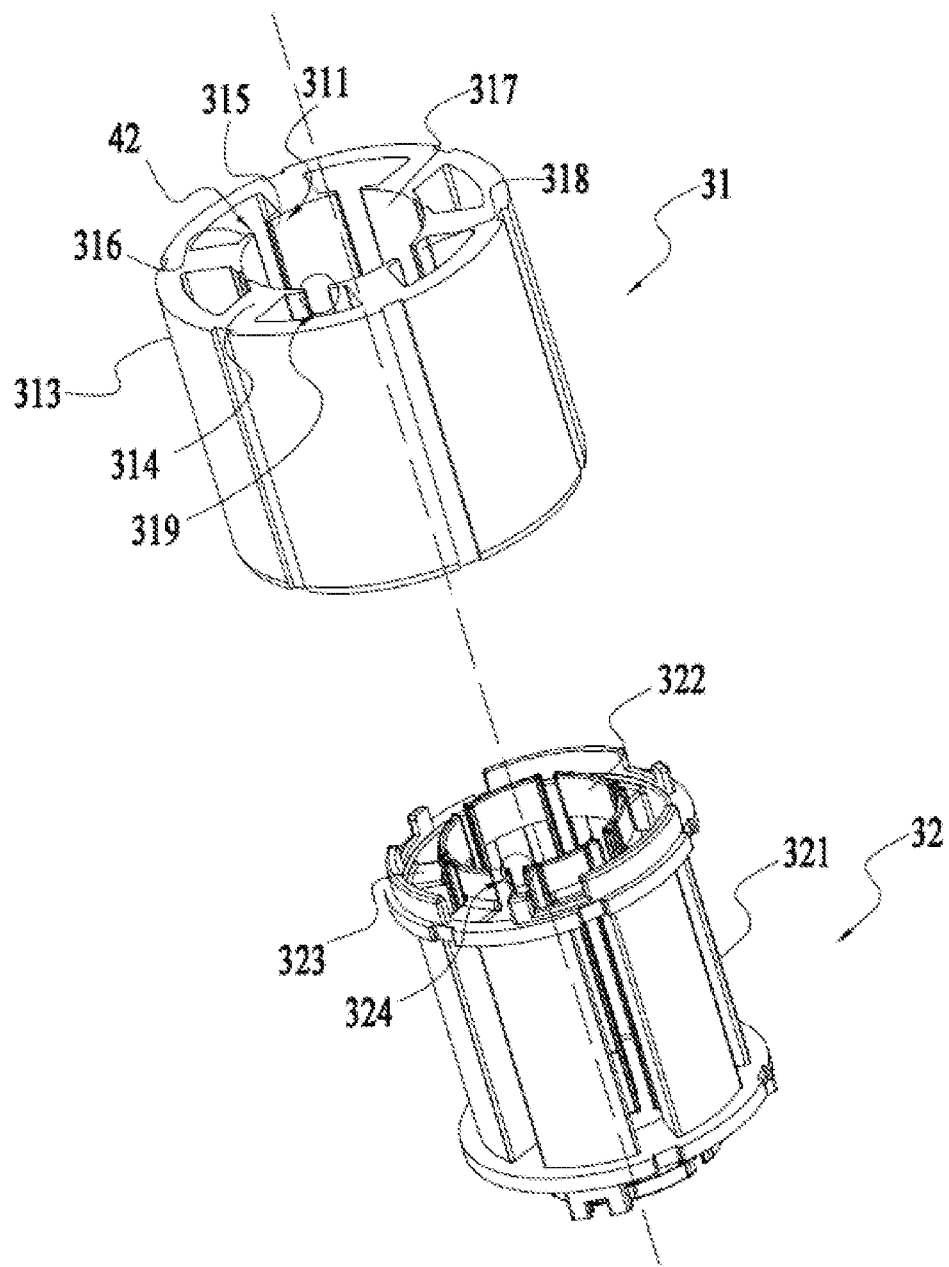
FIG. 4 is a schematic diagram illustrating an electric motor of the power tool according to the first example.

Referring to FIG. 3-6, as an example, the rotor 153 of the electric motor 15 is disposed in the stator 152 of the electric motor 15. The rotor includes a magnetic material such as a permanent magnet, a magnetic steel sheet, etc., and the rotor 153 is fixedly connected to the electric motor shaft 151 to the rotor 153 to rotate the electric motor shaft 151. The electric motor shaft 151 can be inserted into the rotor 153, and is fixedly connected to the rotor 153 to rotate along with the rotation of the rotor 153. Alternatively, one end of the electric motor shaft 153 is provided with a fan 18. The stator 152 is disposed around the rotor 153. A first gap 41 (FIG. 5 and FIG. 6) is defined between the rotor 153 and the stator 152, and the stator 152 defines a second gap 42 (FIG. 4).

Referring to FIG. 3 and FIG. 4, the stator 152 includes a stator core 31, an insulating frame 32 at least partially covered on the stator core 31, and a plurality of winding coils 33 wound around the insulating frame 32. The insulating frame 32 is at least partially located between the winding coil 33 and the stator core 31. The stator core 31, the insulating frame 32, and the rotor 153 extend in the axial direction of the electric motor. FIG. 4 is an enlarged view of the stator core 31 and the insulating frame 32 of FIG. 3.

Figure 5:
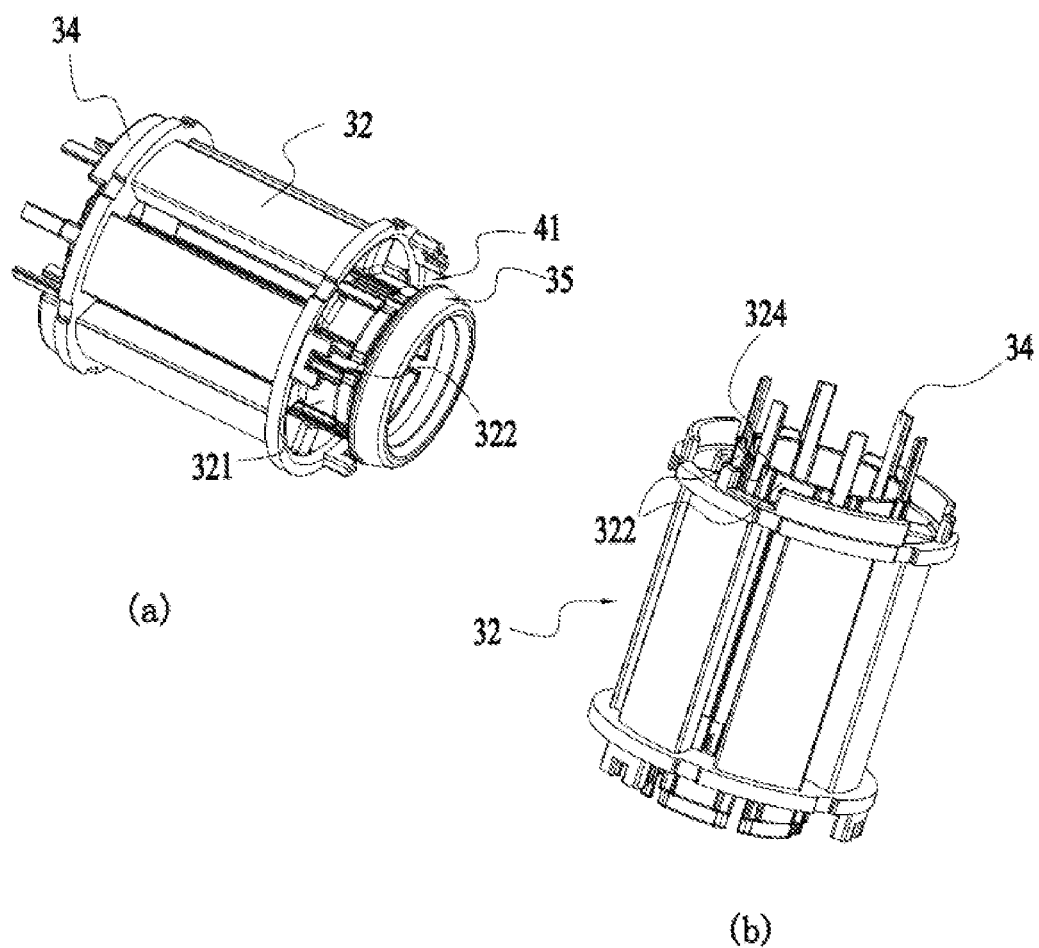
FIG. 5 is a schematic diagram illustrating an electric motor of the power tool according to the first example.

Referring to FIG. 4 and FIG. 5, the stator core 31 includes a main body 313 and a plurality of teeth 311 uniformly distributed radially inward from the main body 313, and each of the teeth 311 includes a winding arm 314 connected to the main body 313 and a crown 315 forming a winding arm 314. The winding arm 314 extends along the axial direction of the electric motor, and a winding groove is defined between the adjacent winding arms 314. The winding groove is provided for accommodating the winding coil 33, and the winding groove is formed as the second gap 42. The second gap 42 is in the airflow channel 19, and the airflow flows through the second gap 42. The airflow is a circulating airflow, which can dissipate heat for the winding coil 33 in the winding groove. A circumference of the crown 315 is larger than the winding arm 314 so as to protrude circumferentially beyond the winding arm 314. The crown 315 is generally curved and extends generally circumferentially, and is generally symmetrically disposed relative to the winding arm 314. In the circumferential direction of the electric motor, the width of the crown 315 is larger than the winding arm 314, and both sides of the circumferential curvature of the crown 315 protrude beyond the winding arm 314 to each form a wing 316. In this example, narrow notches 319 (FIG. 4) are defined between corresponding wings 316 of adjacent crowns 315. Each crown 315 has an outer wall surface 318 facing the winding arm 314 and an inner wall surface 317 facing the rotor 153. The inner wall surface 317 is a circular curved surface, and the inner wall surface 317 of all the crowns 315 serve as inner surfaces of the stator 152, and is generally located on a common cylindrical surface, which is coaxial with the stator 152. The inner surface of the stator 152 defines a space for mounting the rotor 153, and the first gap 41 is defined between the inner surface of the stator 152 and the outer surface of the rotor 153. The first gap 41 and the second gap 42 may communicate with each other through the notch 319. The first gap 41 and the second gap 42 extend in the axial direction of the electric motor.

The insulating frame 32 at least covers the stator core 31. Alternatively, the structure and shape of the insulating frame 32 are adapted to the stator core 31 so as to cover the stator core 31. As a specific example, for example, the insulating frame 32 includes a frame main body 321 corresponding to the main body 313 of the stator core 31, a frame winding arm 323 corresponding to the winding arm 314 of the stator core 31, a frame tooth 321 corresponding to the tooth 311 of the stator core 31, and a frame tooth gap 324 corresponding to the notch 319 defined between the corresponding wings 316 of the adjacent crowns 315 of the stator core 31 described above. The winding coil 33 is wound directly or indirectly around the winding arm 314. In this example, the winding coil 33 is indirectly wound around the winding arm 314 via the insulating frame 32. Specifically, the winding coil 33 is wound around the frame winding arm 323 corresponding to the winding arm 314 of the stator core 31, that is, an insulating frame 32 is isolated between the winding coil 33 and the winding arm 314 of the stator core 31. Thus, the winding coil 33 is separated from the winding arm 314 of the stator core 31 and the outer wall surface 318 by the insulating frame 32. The insulating frame is usually an insulating plastic to avoid short circuit of the winding.

The winding coil 33 is at least partially accommodated in the winding groove. As can be seen from the above-mentioned description, the winding groove forms the second gap 42 which is in the airflow channel 19. The airflow flows through the second gap 42 and is a circulating airflow that is capable of dissipating heat of the winding coils 33 in the winding groove. Since the winding coil 33 is at least partially accommodated in the winding groove, the third gap 43 between the winding coil 33 and the adjacent winding coil is also in the second gap 42, so that the third gap 43 also has a circulating airflow to dissipate heat for the winding coil 33. That is, the second gap 42 includes the third gap 43, which is actually located inside the second gap 42. Thereby, the third gap 43 is also located in the airflow channel 109, and the airflow flows through the third gap 43, that is, there is circulating airflow in the third gap 43.

In order to avoid the electric motor 15 being affected by the metal debris scattered in the space during the operation of the above-mentioned angle grinder 10, the electric motor 15 is further provided with a seal member for sealing the electric motor 15.

Still referring to FIG. 3, the seal member includes a seal ring 35 disposed between the stator 152 and the rotor 153 in a circumferential direction of the motor 15. Specifically, the seal ring 35 is disposed on an end surface of the stator 152 and/or the rotor 153 to seal the first gap 41 between the stator 152 and the rotor 153 at a position of an axial end surface of the electric motor. Alternatively, the seal ring 35 may be specifically disposed at an end of at least one of: the stator core 31; the insulating bracket 32; and the rotor 153, and the seal ring 35 may be disposed near an end facing the air inlet 133. Therefore, during the operation of the angle grinder 10 on the metal workpiece, the metal debris generated by cutting and grinding the metal workpiece cannot enter the space between the stator 152 and the rotor 153 of the electric motor 15 via the air inlet 113 of the angle grinder 10.

Since the rotor 153 of the electric motor 15 includes the magnetic material, and the winding coil 33 of the electric motor 15 also generates an alternating electromagnetic field, therefore, if only the first gap 41 between the stator 152 and the rotor 153 of the electric motor is sealed, the metal debris may still be attracted by the electromagnetic field generated by the operation of the electric motor 15, and thus enter the interior of the electric motor 15 via the second gap 42 formed by the stator 153 of the electric motor 15, the third gap 43 formed between respective winding coils 33, and the narrow notch 319 formed between corresponding wings 316 of the adjacent crowns 315 of the stator core 31. Therefore, a seal strip 34 disposed in the axial direction may be further provided to isolate the first gap 41 and the second gap 42 to seal the first gap 41 of the electric motor 15 to prevent foreign matter from entering the first gap 41 of the interior of the electric motor. In some specific examples, the seal strips 34 are disposed in narrow notches 319 formed between corresponding wings 316 of adjacent crowns 315 of the stator 151 and/or on the insulating frame 32 corresponding to each of the frame tooth gaps 324 of each of the notches 319, and the seal strip 34 extends along the axial direction to completely seal the frame tooth gaps 324 in the notches 319 and/or the insulating frame 32 corresponding to each of the notches 319, so as to prevent debris such as metal debris from entering the interior of the electric motor as much as possible. Specifically, it can prevent foreign matter from entering between the stator 152 and the rotor 153 thereby blocking the rotor with the inhaled metal debris such that the rotor would be stalled from rotating.

Thus, providing the seal ring 35 and the seal strip 34 can prevent metal debris from entering the interior of the electric motor 15, and prevent the stator 152 and the rotor 153 of the electric motor 15 from being blocked by metal debris and rotor-locked as much as possible. However, since the interior of the electric motor 15 is sealed by the above-mentioned seal member, heat generated during the operation of the winding coil 33 of the electric motor 15 will accumulate in the above-mentioned sealed structure of the electric motor 15. Thus, the high temperature accumulated will demagnetize the magnetic material in the electric motor 15, causing the electric motor to fail, which is irreversible.

In order to dissipate heat from the motor, the fan 18 drives the airflow to dissipate heat. The heat dissipation of the rotor 153 of the electric motor 15 is mainly achieved by the airflow inside the air gap between the stator 152 and the rotor 153 of the electric motor 15. However, due to the configuration of the above-mentioned seal member, the airflow between the stator 152 and the rotor 153 is isolated by the seal member, and the heat of the rotor 153 cannot be dissipated via the airflow in the air gap between the stator 152 and the rotor 153. Thereby, the heat generated by the rotor 153 of the electric motor cannot be dissipated by the air flow in the air gap between the stator 152 and the rotor 153, so that heat is accumulated in the sealed structure of the electric motor 15.

Figure 6:
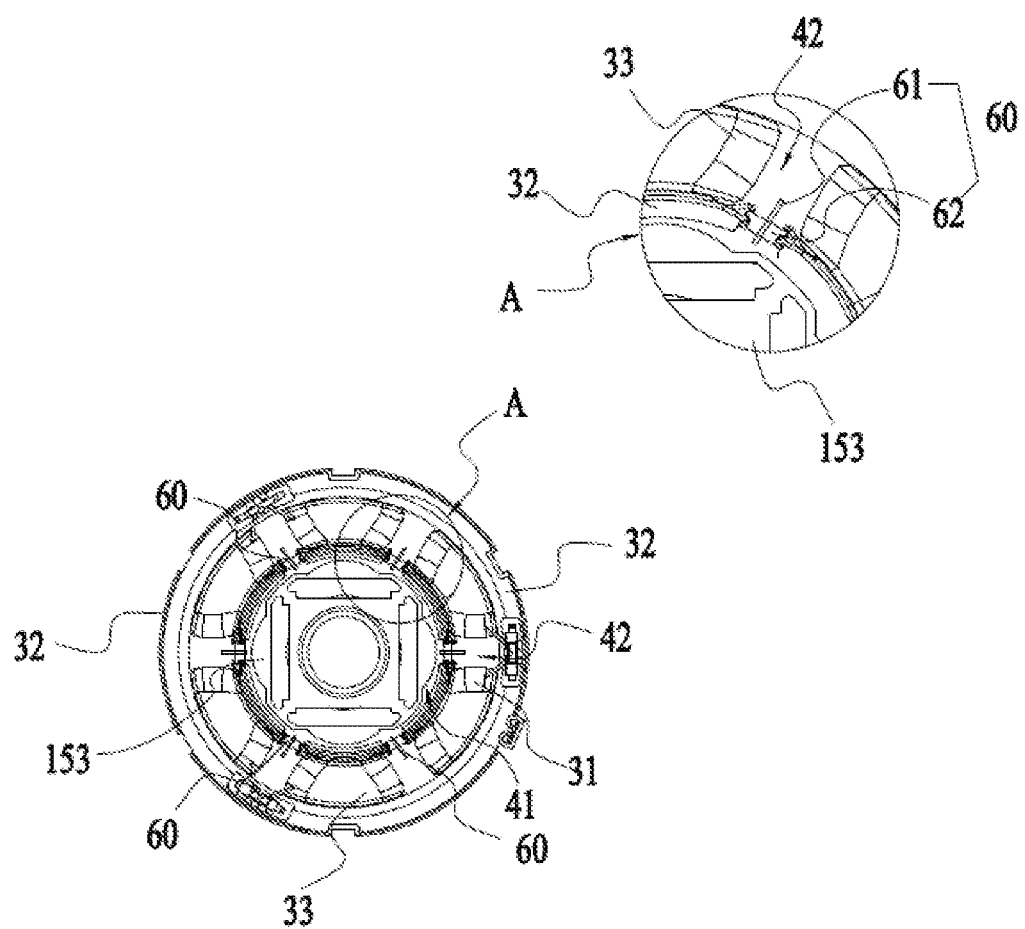
FIG. 6 is a schematic diagram illustrating the electric motor installed with a thermal conduction member of the power tool according to the first example.

Referring to FIG. 6, in order to avoid the magnetic material from being demagnetized or the electric motor circuits and circuit components from being damaged due to the overheating of the interior of the electric motor 15, the electric motor 15 may further include a thermal conduction member disposed at least between the rotor 153 and the stator 152 and extending toward the airflow channel 19 to conduct heat between the rotor 153 and the stator 152 into the airflow channel 19.

As a possible example, the thermal conduction member 60 extends from the first gap 41 to the second gap 42 for conducting heat in the first gap 41 to the second gap 42. In this way, heat in the first gap 41 between the rotor 153 and the stator 152 is conducted into the second gap 42 located in the airflow channel 19 to dissipate heat via the airflow in the second gap 42. Since the second gap 42 is in the airflow channel, heat transferred to the second gap 42 can be dissipated.

Still referring to FIG. 6, as an example, the thermal conduction member 60 includes a thermal conduction portion 61 and a mounting portion 62 connected to the thermal conduction portion 61. The mounting portion 62 is configured for mounting the thermal conduction member 60 on the stator 152. The thermal conduction portion 61 extends toward the airflow channel 19. At least the thermal conduction portion 61 is made of the thermal conductive material. The mounting portion 62 may be integrally formed by the thermal conductive material of the thermal conduction portion 61, that is, the thermal conduction member 60 is integrally formed, and the mounting portion 62 may be formed by another insulating material, or the mounting portion 62 may be composed of the thermal conductive material and the insulating material.

The mounting portion 62 is mounted on the insulating frame 32 and connected to the thermal conduction portion 61. The thermal conduction portion 61 extends from the first gap 41 between the stator 152 and the rotor 153 of the electric motor 15 to the second gap 42 formed by a winding groove of the stator 152 of the electric motor 15 or the third gap 43 between the adjacent winding coils 33 and located in the second gap 42. The heat in the first gap 41 can be dissipated by the airflow in the second gap 42 (the gap formed by the winding groove) and the airflow in the third gap 43 (the gap between the adjacent winding coils 33). In this way, the heat between the rotor 153 and the stator 152 (the heat is mainly generated during the operation of the rotor 153) is dissipated.

In the present example, the thermal conduction member 60 is mounted on a portion of the insulating frame 32 between the rotor 153 and the stator 452. Optionally, the thermal conduction member 60 is mounted between adjacent frame teeth 321 of the insulating frame 32 and stretches across the end positions of the two adjacent frame teeth 321 of the insulating frame 32 (refer to FIG. 6 in point A). Of course, the thermal conduction member 60 will not be limited to the above mounting manner, where other mounting manners may also be possible. For example, the thermal conduction member 60 may be installed at a central position of two adjacent frame teeth 321 of the insulating frame 32. As a further example, the mounting portion 62 of the thermal conduction member 60 may be disposed on the stator core 31 or the insulating frame 32 of the stator core 31 along the axial direction. Specially, the thermal conduction member 60 is disposed along the axial direction at the frame tooth 321 of the insulating frame 32 and/or the narrow notch 319 defined between the corresponding wings 316 of the adjacent crowns 315 of the stator core 31 to completely fill the frame tooth gap 324.

There may be a plurality of thermal conduction members 60, which are distributed over each of the frame tooth gaps 324 of the insulating frame 32 and/or the notches 319 of the crowns 315 of the stator core 31. The thermal conduction portion 61 is fixedly disposed at an intermediate position of the mounting portion 62. The thermal conduction portion 61 conducts heat between the stator 152 and the rotor 153 of the electric motor to the second gap 42 constituted by the winding groove defined by the stator 152 and the third gap 43 between the adjacent winding coils 33. Since the airflow is circulated in the second gap 42 of the stator 152 of the electric motor 15, the heat is dissipated via the circulating airflow.

Optionally, the angle grinder 10 further includes the fan 18. The fan 18 is accommodated in the housing 11 and mounted on and driven by the electric motor shaft 151 to drive airflow into motion, so that air in the second gap 42 formed by the winding groove defined by the stator 152 and air in the third gap 43 between the adjacent winding coils 33 would flow to remove the heat from the air outlet 114 along with the airflow to achieve the purpose of effective heat dissipation inside the motor 15. Therefore, the technical contradiction between the motor sealing and heat dissipation inside the electric motor is solved.

As another possible example, in the case where the electric motor 15 needs to be sealed, a thermal conductive material (for example, copper) may be selected as the above-mentioned seal strip 34, which faces the first gap 41 between the rotor 153 and the stator 152 on one side and the second gap 42 on the other side. In this way, the seal strip 34 serves as an alternative heat dissipating structure that can seal the electric motor 15 and simultaneously conduct heat from the first gap 41 between the stator 152 and the rotor 153 of the electric motor 15 to a portion where the airflow circulates in the second gap 42 to dissipate heat. Therefore, a similar heat dissipation effect can be achieved as well.

In the working environment of the power tool, if there is no metal debris, dust, fine particles, or the like, there is no need to add the seal member described in the first example to the electric motor 15 of the power tool. However, under normal operating conditions, the mechanical structure of the winding coil 33 of the electric motor 15 and the rotor still generates heat due to thermal effects of the current or mechanical friction. Since the major heat generating components such as the winding coil 33 of the electric motor 15 and the electric motor shaft 151 are distributed inside the electric motor 15, the heat generated during the operation of the electric motor 15 can still be dissipated by the heat dissipation structure similar to the previous example.

The above examples illustrates the present disclosure by taking the angle grinder 10 as an example, but the present disclosure will not be limited to the above-described angle grinder, and may be applied to the sander 70.

In the second example according to the present disclosure, the sander 70 is taken as an example for explanation. The sander 70 is a mechanical device used for sanding work. Sanding is synonymous as grinding, both referring to the processing of materials and articles that are uneven in thickness or inconsistent with technical requirements using mechanical equipment into standard ones that have a smooth surface and uniform thickness and that meet the various technical requirements. Therefore, sanders 70 are widely used in various fields such as machinery and home improvement. In grinding the surface of a material, the sander 70 may produce large material pieces of debris such as metal debris, wood debris, or the like.

Figure 7:
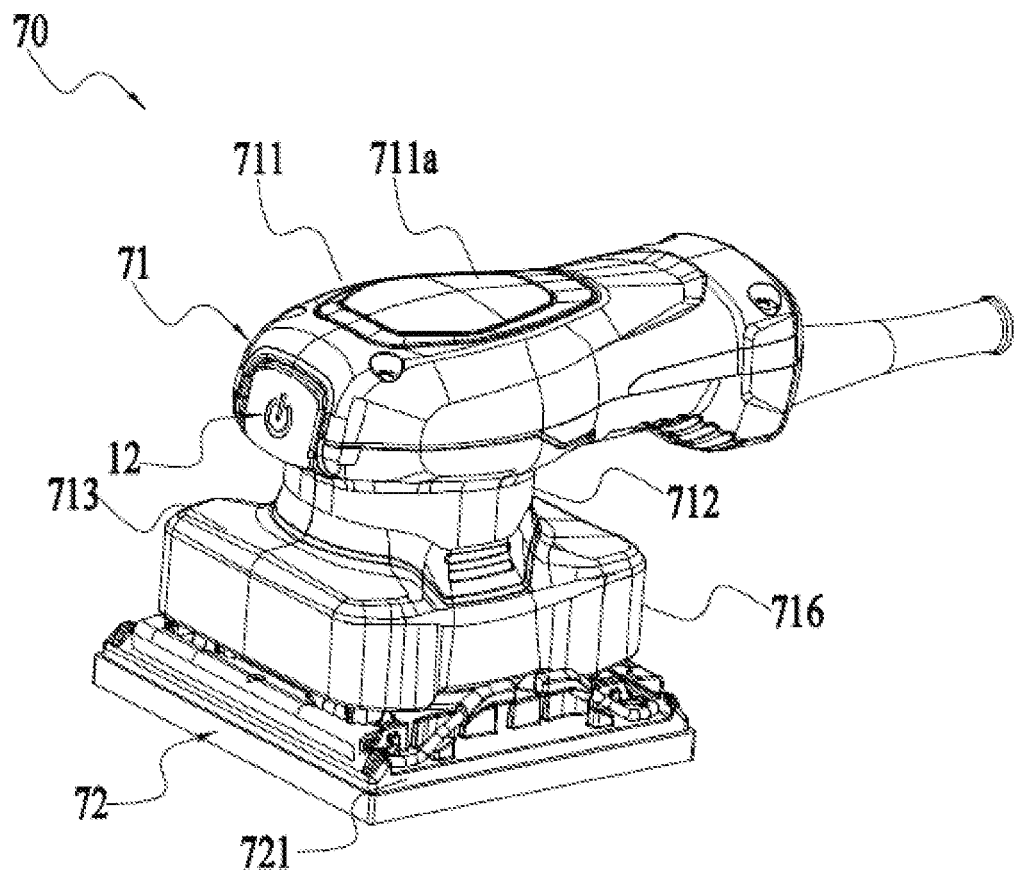
FIG. 7 is a schematic diagram illustrating an internal structure of a power tool according to a second example.
Figure 8:
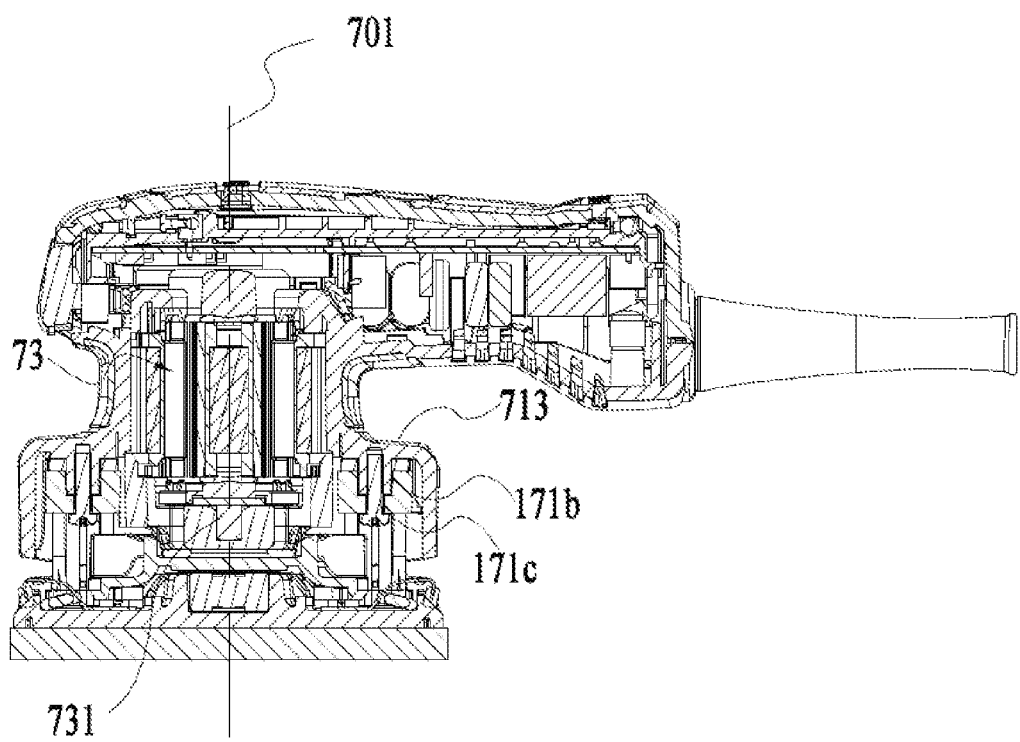
FIG. 8 is a cross-sectional view of the power tool according to the second example.

Referring to FIG. 7 and FIG. 8, the sander 70 includes: a housing 71; a base plate assembly 72, including a base plate 721 that forms a base plate plane; and an electric motor 73, configured for driving the base plate assembly 72 to move, specifically for driving the base plate 721. When driven by the electric motor 73, the base plate 721 is movable about a longitudinal axis 701 relative to the housing 71, and the housing 71 is formed with an accommodation portion for at least accommodating a part of the electric motor 73. The sander 70 may further include a connection frame which is disposed between the base plate assembly 72 and the housing 71 and which connects these elements to limit the movement of the base plate assembly 72 relative to the housing 71 to a certain range.

The housing 71 serves as an outer shape portion of the sander 70 and is formed with a grip 711, a first accommodation portion 712, a mounting portion 713, and a surrounding portion 716. The grip 711 is configured to be held by the user and is located above the entire sander 70. One end of the grip 711 is connected to the first accommodation portion 712, and the other end can be connected to a cable connected to the external power cord. The first accommodation portion 712 is located between the grip 711 and the surrounding portion 716, and forms an internal first accommodation cavity. The surrounding portion 716 forms a height space for accommodating the connection frame, and the mounting portion 713 connects the first accommodation portion 712 and the surrounding portion 716. The base plate assembly 72 is configured to fix the grinding member for achieving the function of grinding and polishing. The base plate assembly 72 includes a base plate 721 forming a base plate plane. A side of the base plate 721 adjacent to the housing 71 is configured to set the connection frame, and the other side of the base plate 721 is configured to fix a grinding member such as a sandpaper. The grinding member moves along with the bottom plate, thereby grinding and polishing the surface to be processed. The housing 71 is further provided with an air inlet 714 and an air outlet 715, and an airflow channel, i.e., an air passage, is formed between the air inlet 714 and the air outlet 715. The airflow channel is defined inside the housing 71 and the airflow enters via the air inlet 714 and is discharged via the air outlet 715.

The sander 70 further includes a power mechanism, configured for driving the base plate assembly 72 to move and may further including an electric motor 73 and a transmission mechanism. For a flat swing typed sander 70, the base plate assembly 72 includes a longitudinal axis 701 that passes through the base plate assembly 72. The power mechanism can drive the base plate assembly 72 to rotate about the longitudinal axis 701 relative to the housing 71, at the same time, the power mechanism further drives the base plate assembly 72 to swing about the longitudinal axis 701 thereof over a preset range of angles, thereby achieving the function of grinding and polishing of the sander 100. The electric motor 73 serves as a power source component in the accommodation cavity formed by the first accommodation portion 712, and includes an electric motor shaft 731, a stator 732 and a rotor 731. The electric motor shaft 731 is connected to the output shaft 75 to drive the output shaft 75 to rotate. The output shaft 75 is connected to the base plate assembly 72 to drive the base plate assembly to move. The electric motor shaft 731 is connected to and is driven by the rotor 733.

The transmission mechanism is disposed between the electric motor 73 and the base plate assembly 72, and is operatively connected to the electric motor 73 and the base plate assembly 72 for transmitting power of the electric motor 73 to the base plate assembly 72 such that the base plate assembly 72 is swung relative to the housing 71. Alternatively, the sander 70 further includes a fan 74 connected to and driven by the electric motor shaft 731 to drive airflow into motion and the airflow enters via the air inlet 714 and exits the air outlet 715.

Referring to FIG. 8, when grinding the surface of the material, the sander 70 produces large pieces of material debris such as metal debris, wood debris, or the like. Therefore, a sealing process is required to be performed on the electric motor 73 while also considering how the stator 732, the rotor 733, and the electric motor shaft 731 dissipate heat under the operation of the electric motor 73. The electric motor 73 may be any type of electric motor 73, which is not limited herein. The electric motor 73 is similar in structure to the electric motor 15 in the first example, and includes an electric motor shaft 731, a stator 732, and a rotor 733. The stator 732 includes a stator core 81, an insulating frame 82, and a winding coil 83.

In order to solve the contradiction between the heat dissipation problem and the sealing problem, a heat dissipation structure is disposed inside the sander 70. The structural configuration of the stator 732 is similar to that of the stator 152 of the electric motor 15 in the first example described above.

Figure 9:
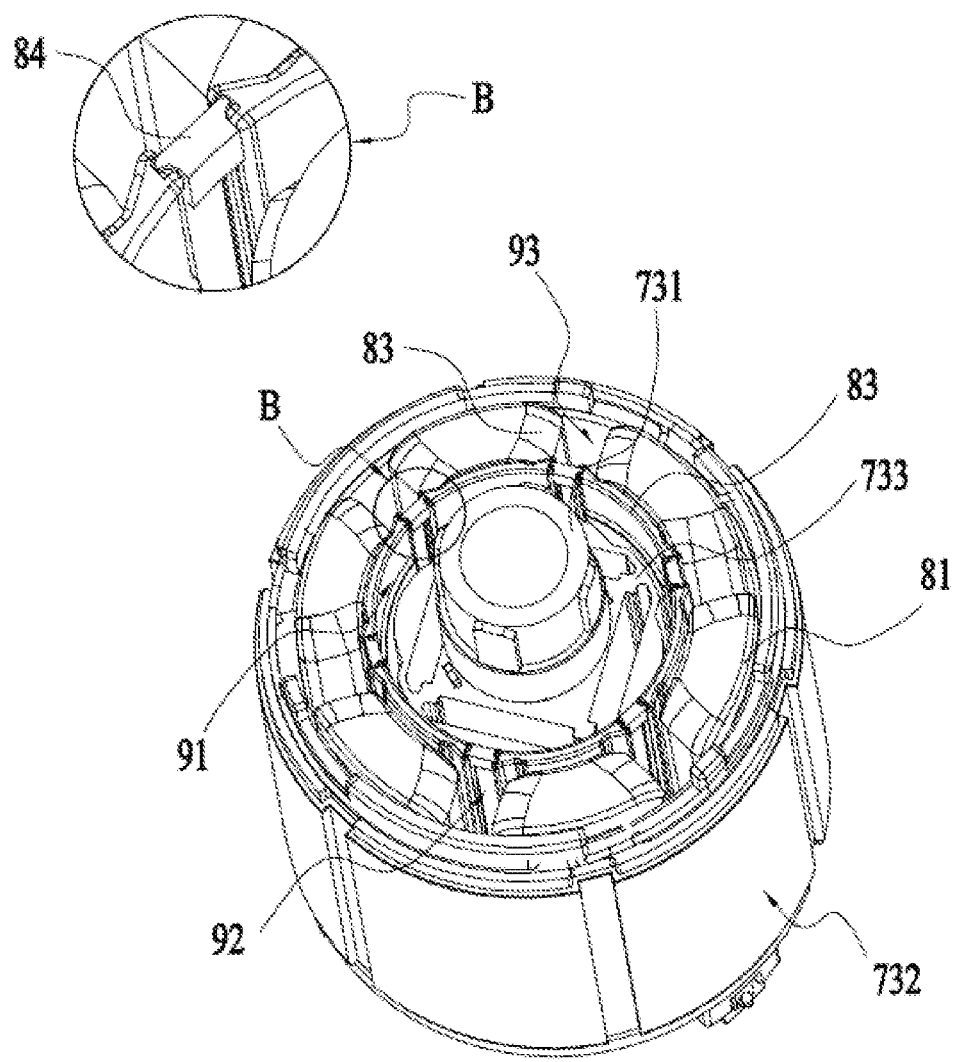
FIG. 9 is a schematic diagram illustrating the electric motor installed with a thermal conduction member of the power tool according to the second example.

Referring to FIG. 8, as an example, the heat dissipation structure includes a thermal conduction member 84 least partially made of the thermal conductive material. The thermal conduction member 84 is disposed at least between the rotor 733 and the stator 732 with one side facing the airflow channel and the other side facing the rotor 733 to conduct heat between the rotor 733 and the stator 732 into the airflow channel. Specifically, a first gap 91 is maintained between the stator 732 and the rotor 733 of the electric motor 73. The winding groove of the stator forms a second gap 92, and a third gap 93 is maintained between the adjacent winding coils 83. The thermal conduction member 84 is disposed between the first gap 91 and the second gap 92 with one surface facing the first gap 91 and the other surface facing the second gap 92. By employing such mode, the thermal conduction member 84 can conduct heat of the first gap 91 into the second gap 92 and the third gap 93 to dissipate heat via the circulating airflow in the second gap 92. As a specific example, the thermal conduction member 84 is disposed on the frame teeth gap of the insulating frame 82 and/or the narrow notches formed between the corresponding wings of the adjacent crowns of the stator 732 (referring to point B in FIG. 9). The thermal conduction member 84 conducts heat in the first gap 91 of the electric motor 73 to the second gap 92 formed by the winding groove of the stator 732 and the third gap 93 between the adjacent winding coils 83. As described in the first example above, the second gap 92 and the third gap 93 are located in the air flow channel, and the airflow flows through the second gap 92 and the third gap 93.

Optionally, the sander 70 further includes the fan. The fan operates as the fan 18 in the first implementation, and the rotation of the electric motor 73 drives the fan to form a circulating airflow, and the airflow circulates to form an airflow channel (i.e., an air passage), and the airflow channel passes through the electric motor stator 732. The second gap 92 and the third gap 93 are located in the airflow channel, and the flowing airflow flows through the second gap 92 and the third gap 93. The flowing airflow can take away the heat conducted by the thermal conduction member 84 to achieve the purpose of dissipating heat of the internal cavity and the body of the rotor 733 of the electric motor 73.

Therefore, the thermal conduction member 84 can indirectly bring the internal cavity between the stator 732 and the rotor 733 to a thermal exchange effect consistent with the outside to reduce the overall temperature of the electric motor 73, prevent the electric motor from demagnetizing due to high temperature, and improve the operation reliability of the electric motor 13 under operation conditions.

The thermal conduction member 84 in the present example is integrally formed on the insulating frame 82 of the stator 732 or the stator 732 by the thermal conductive material. Relative to the thermal conduction member in the first example, the design herein is simpler. Certainly, the thermal conduction member 84 of the present example will not be limited to the above structure, and a structure similar to that of the first example may be employed, including a thermal conduction portion and a mounting portion. A thermal conduction portion made of the thermal conductive material is fixed to the interior of the electric motor 73 via a mounting portion made of an insulating material. The experimental data of the heat dissipation effect of the heat dissipation structure of the present example on the electric motor shows that under the simplified heat dissipation structure, the measured electric motor with the copper serving as the thermal conduction material, the copper material can make the temperature of the electric motor core under the working power of 1100 watts reduce by 10° C. relative to a plastic part, therefore the simplified heat dissipation structure has offered significant heat dissipation effect.

The above example is merely illustrative of the present disclosure by the angle grinder 10 and the sander 70. However, the present disclosure will not be limited to the above-described power tools, and can be applied to other power tools such as garden tools.

Figure 10:
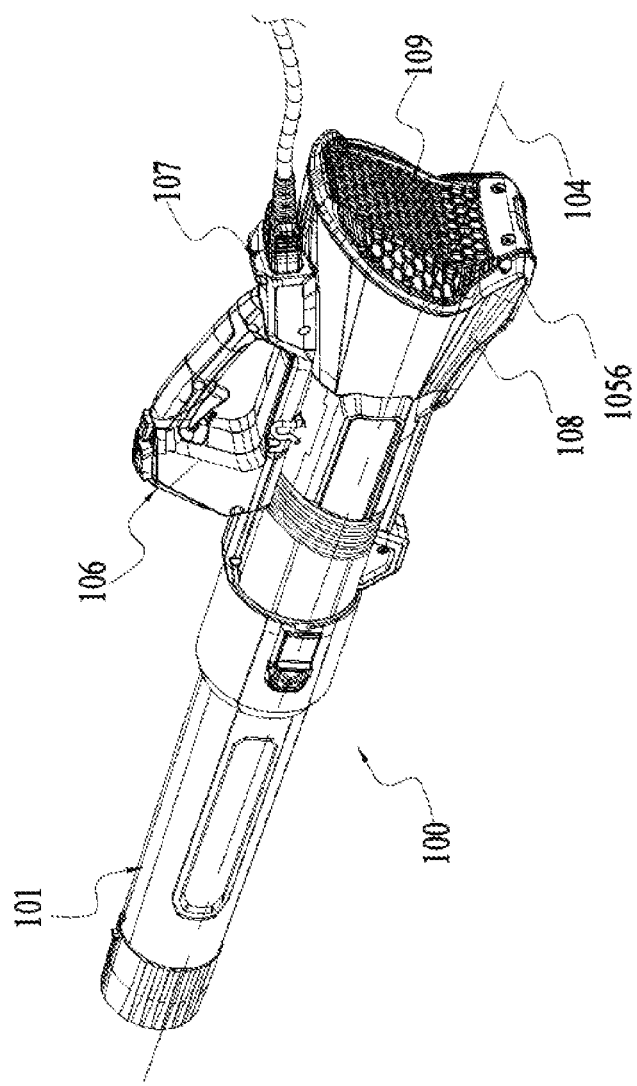
FIG. 10 is a schematic diagram illustrating the power tool according to a third example.
Figure 11:
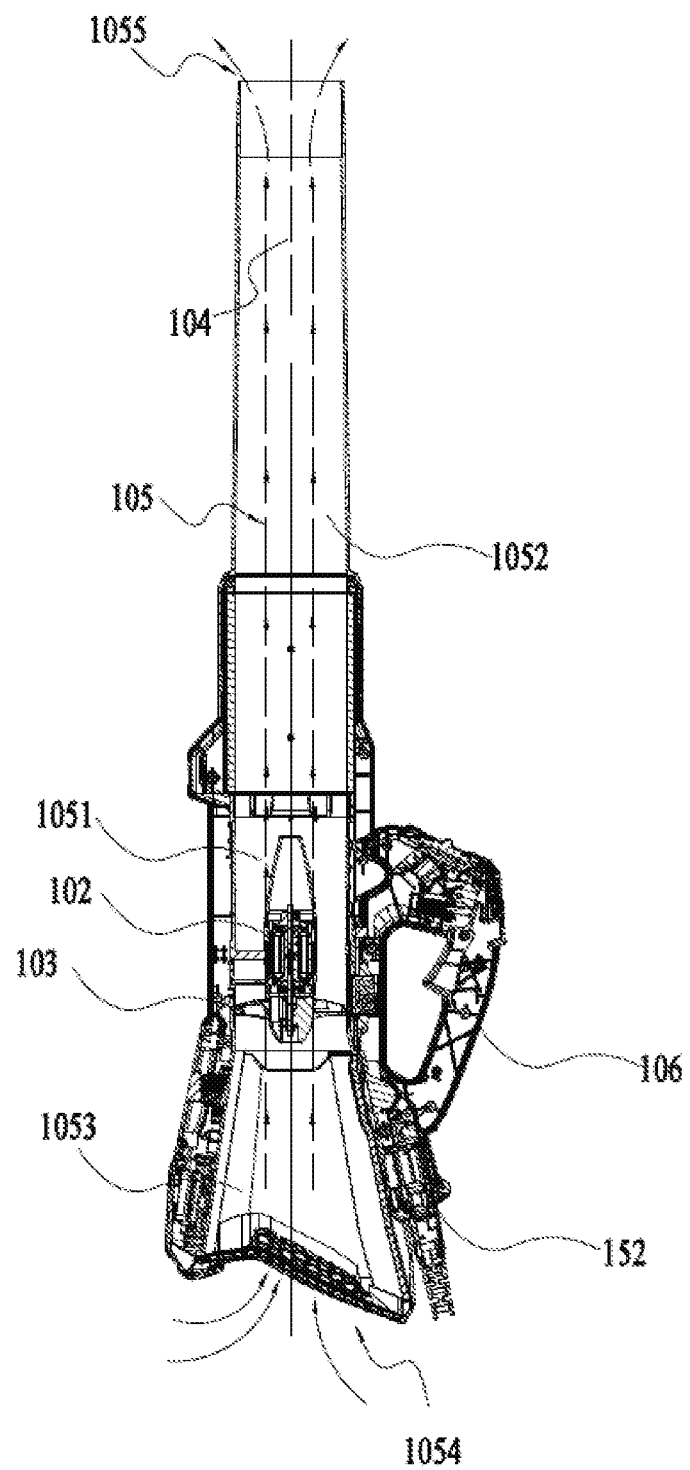
FIG. 11 is a schematic diagram illustrating an internal structure of a power tool according to the third example.

In the third example according to the present disclosure, the air blower 100 is taken as an example to explain the present disclosure. The air blower 100 serves as the garden tool for the user to operate to blow grass debris, leaves, etc. to clean the courtyard or garden. Referring to FIG. 10 and FIG. 11, the air blower 100 may include a housing 101, an electric motor 102, and a fan 103.

The housing 101 is formed with an airflow channel 105 extending along the direction of a first straight line 104, and an accommodation portion 1051, wind channel 1052, an air inlet portion 1053, and a handle 106 are formed along the extending direction of the airflow channel 105. The accommodation portion 1051 is configured for accommodating and installing the fan 103 and the electric motor 102. The air inlet portion 1053 is configured for introducing the airflow from the outside into the airflow channel 105. The wind channel 1052 is configured for introducing the airflow flowing through the fan 103 to flow out of the airflow channel 105. The handle 106 is configured for the user to grip. The housing 101 is further substantially symmetrical about a symmetrical plane parallel to the first line 104. Specifically, the housing 101 includes a first housing and a second housing that are symmetrical about a symmetrical plane, where the first housing and the second housing may be two separate parts that may be fixedly connected by screws. When connecting with each other, the first housing and the second housing enclose with each other to form the airflow channel 105. The airflow channel 105 is substantially a cylinder surrounding the first straight line 104, and the cylinder includes an inner wall and an outer wall.

The housing 101 is further provided with an air inlet 1054 and an air outlet 1055. The airflow enters via the air inlet 1054 and is discharged by the air outlet 1055. The airflow channel 105 is formed between the air inlet 1054 and the air outlet 1055. Specifically, the air inlet 1054 is formed in the air inlet portion 1053 of the airflow channel 105 and is further provided with a partition net 109. The partition net 109 is of a grid shape, covering at least a part of the air inlet 1054, and is connected to the air inlet 1054 via a detachable component. The partition net 109 allows the blowing airflow to uniformly enter the airflow channel 105 and also prevents larger particles of debris from entering the airflow channel 105. The air outlet 1055 is disposed opposite to the air inlet 1054 and is located on a side of the airflow channel 105 away from the air inlet portion 1053.

The housing 101 is further formed with a mounting portion 1056, configured for accommodating a circuit board 108. Specifically, the mounting portion 1056 is a protrusion on the circumference of the convex accommodation portion 1051 formed on the outer diameter of the air inlet portion 1053 along the first straight line 104 away from the air inlet 1054. The protrusion forms a mounting chamber that defines the mounting portion 1056, configured for accommodating a circuit board 108. The electric motor 102 is controlled by electronic components on the circuit board 108 to drive the fan 104 to rotate. Specifically, the mounting portion 1056 is at a lower position on the rear side of the blower 100, and forms a streamlined design shape suitable for the housing 101.

The housing 101 is further formed with a joint portion 107 formed at the rear position of the handle 106, and the joint portion 107 is connected with an external lead wire, configured for connecting the electric power device for supplying power to the electric motor 102.

The electric motor 102 is accommodated in the housing 101. Specifically, the electric motor 102 is accommodated in the accommodation portion 1051. The electric motor 102 includes an electric motor shaft 1021, a stator 1022 and a rotor 1023. The electric motor shaft 1021 is connected to and is driven by the rotor 1023. The electric motor shaft 1021 is operatively connected to the fan 103. The fan 103 is disposed at one end of the electric motor shaft 1021 and adjacent to a side of the air inlet portion 1053. The electric motor 102 is similar to the electric motor 15 and the electric motor 73 in the above-mentioned examples. The electric motor 102 is configured to drive the fan 103 to rotate about the first shaft 104. The fan 103 is configured to drive the airflow into motion to generate an airflow from the air inlet portion 1053 into the airflow channel 105. Specifically, when the fan 103 rotates, the airflow is driven to enter via the air inlet 1054, flowing through the electric motor 102 and the fan 103, and is discharged via the air outlet 1055, so that the airflow is driven to form a circulating airflow in the airflow channel 105.

When the blower is in operation, it may have a large output power so that the electric motor 102 may produce a large amount of heat, and there may be plenty of dust, debris or fine particles in the operating environment when the blower is in operation, the above-mentioned sealing member may be provided to the electric motor 102. In order to dissipate heat of the electric motor 102, a thermal conduction member may be provided within the electric motor 102. The electric motor includes an electric motor shaft 1021, a stator 1022, and a rotor 1023. The electric motor 102 in this example has the same structure as that of the first example and the second example.

Figure 12:
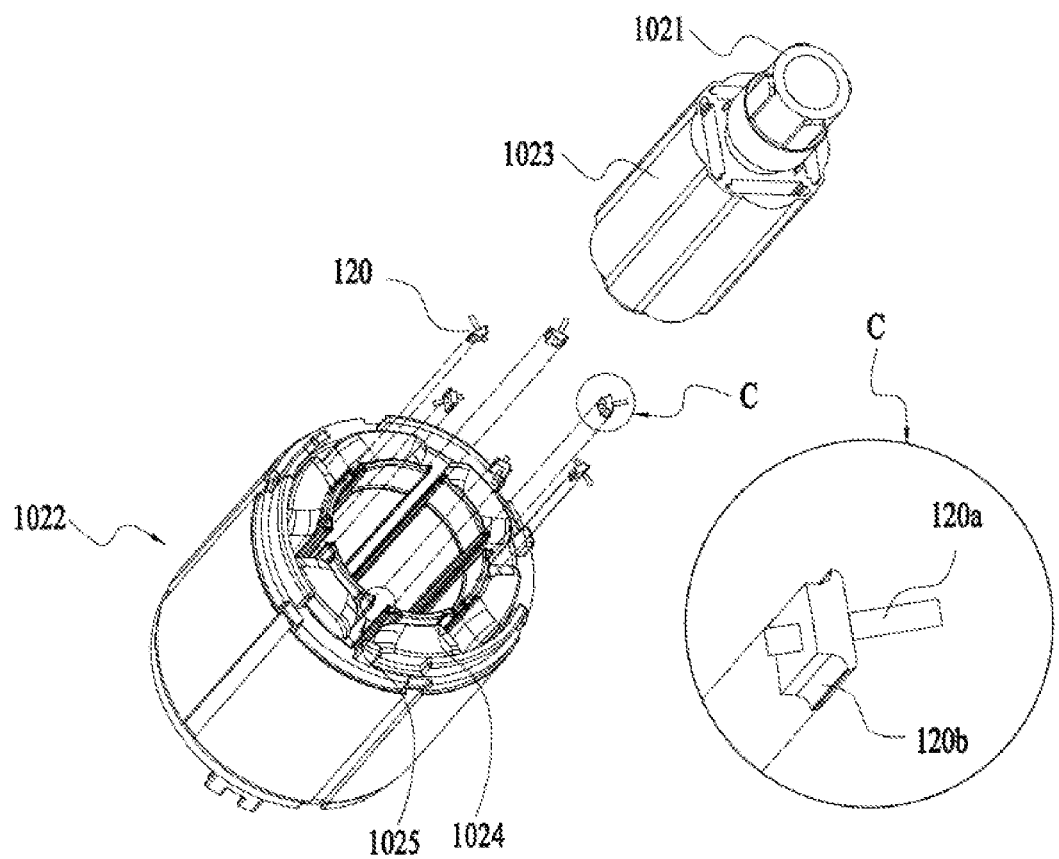
FIG. 12 is a schematic diagram illustrating the installation of the thermal conduction member of the electric motor of the power tool according to the third example.

Referring to FIG. 12, a thermal conduction member 120 is disposed between the stator 1022 and the rotor 1023 and extends toward the airflow channel 105 to conduct heat between the rotor 1023 and the stator 1022 to the airflow channel 105 to dissipate heat via the circulating airflow in the airflow channel 105. The thermal conduction member 120 is at least partially composed of a thermal conductive material. The thermal conduction member 120 may be specifically disposed on the insulating frame 1024 of the stator 1022 and between the rotor 1023 and the stator 1022.

Still referring to FIG. 12, in the present example, the thermal conduction member 120 extends in the axial direction from the one end adjacent to the stator 1022 and/or rotor 1023 in the cavity inside the electric motor 1022 to the other end to completely fill the frame tooth gap 1025 of the insulating frame 1024. The frame tooth gap 1024 of the insulating frame 1024 in this example has the same structure and position as the first example.

As an example, the thermal conduction member 120 can refer to the structure of the thermal conduction member 120 in the sander 70 in the second example, and can be integrally formed by the thermal conductive material. One side of the thermal conduction member 120 faces the first gap between the stator and the rotor, and one side faces the second gap formed by the winding groove and the third gap formed between the adjacent winding coils. Unlike the second implement mode, since the thermal conductive material of the thermal conduction member 120 extends along the axial direction completely to the entire internal cavity of the electric motor, the thermal conduction member 120 can simultaneously serve as a seal strip to isolate the rotor and the stator and keep foreign matter from entering the interior of the electric motor 102. In this way, the thermal conduction member 120 can seal the electric motor as a seal member, and can also transfer heat between the stator 1022 and the rotor 1023 of the electric motor to the airflow channel as a thermal conduction member, and dissipate heat of the electric motor 102 by using the circulating airflow in the airflow channel 105. As a result, the sealing of the electric motor can be realized while dissipating heat of the sealed electric motor 102, thereby effectively protecting the electric motor 102.

Compared to the second example, because the thermal conductive material extends in the axial direction completely to the entire internal cavity of the electric motor, the thermal conduction member 120 in the present example can conduct more heat into the airflow channel 105 to take advantage of the circulating airflow in the airflow channel 105 to perform heat dissipation process.

As another example, the specific structure of the thermal conduction member 120 can refer to the first example, and includes the mounting portion 102b and the thermal conduction portion 102a that are interconnected and that are integrally formed or respectively composed of the insulating material and the thermal conductive material. The mounting portion 102b is fixed to the stator 1022 of the electric motor 102 or the insulating frame 1024 of the stator 1022, and the thermal conduction portion 102a extends toward the airflow channel 105. Unlike the first example, where the thermal conduction member 120 is merely mounted at a position close to the end, the thermal conduction portion 102a and the mounting portion 102b of the thermal conduction member 120 in the present example both extend in the axial direction of the electric motor 102 in the internal cavity of the electric motor 102 from one end, adjacent to the stator 1022 and the rotor 1023, of the thermal conduction member 120 toward the other end. The mounting portion 102b of the thermal conduction member 120 can completely fill the frame tooth gap 1025 of the insulating frame 1024, and can simultaneously serve as a seal strip to isolate the rotor and the stator to prevent external foreign matter from entering the interior of the electric motor 102.

Compared to the first example, due to extending completely in the axial direction in the present example and having a longer length in the axial direction, the thermal conduction member 120 and the thermal conduction portion 102a thereof in the present example can conduct more heat into the airflow channel 105 to take advantage of the circulating airflow in the airflow channel 105 to perform heat dissipation process. The frame tooth gap 1024 of the insulating frame 1025 in this example has the same structure and position as the first example.

Compared to the first example and the second example, due to extending completely in the axial direction to the entire internal cavity of the electric motor, and the portion of the thermal conductive material of the thermal conduction member 120 is longer in the axial direction, the thermal conduction member 120 in the present example can conduct more heat into the airflow channel 105 to take advantage of the circulating airflow in the airflow channel 105 to perform heat dissipation.

The heat between the rotor 1023 and the stator 1022 is conducted to the airflow channel 105 of the electric motor 102 via the thermal conduction member 120 in the above-mentioned example, and the fan 103 is driven by the electric motor 102 to form a circulating airflow in the airflow channel 105 to dissipate heat inside the electric motor 102.

The thermal conduction member of each of the above-mentioned examples can accelerate the heat dissipation between the stator and the rotor of the electric motor in a state where the electric motor is not sealed, that is, the electric motor does not include the above-mentioned seal member, thereby further improving the heat dissipation efficiency of the electric motor and protecting the electric motor.

The operation of the power tool described above also relies on circuit components that are at least partially disposed on the circuit board that constitutes a circuit system that is well known to those skilled in the art and will not be described herein. It should be noted that the electric motor of the above-mentioned power tool may be the brushless electric motor or the electric motor with the brush, may be a DC electric motor or an AC electric motor, and may be an inner rotor electric motor or an outer rotor electric motor. No restrictions are imposed herein.

The foregoing illustrates and describes the basic principles, main features and advantages of the present disclosure. It is to be understood by those skilled in the art that the above examples do not limit the present disclosure in any form, and all solutions obtained by means of equivalent substitution or equivalent transformation shall all fall in the scope of protection of the present disclosure.

What is claimed is:

1. An angle grinder, comprising:
a housing, comprising an air inlet and an air outlet;
an output shaft, configured for supporting a grinding disc;
an electric motor, accommodated in the housing and comprising an electric motor shaft, a stator and a rotor, wherein the electric motor shaft is operatively connected to the output shaft to drive the output shaft to rotate thereby driving the grinding disc to rotate, wherein the electric motor shaft is coupled to and configured to be driven by the rotor; and
an airflow channel, located inside the housing and defined between the air inlet and the air outlet;
wherein airflow enters via the air inlet and is discharged via the air outlet and the angle grinder further comprises a thermal conduction member, disposed at least between the rotor and the stator and extending toward the airflow channel, to conduct heat between the rotor and the stator into the airflow channel.

2. The angle grinder according to claim 1, further comprising a seal member disposed in the electric motor and comprising a seal strip axially disposed between the stator and the rotor and/or a seal ring circumferentially disposed between the stator and the rotor.

3. The angle grinder according to claim 1, wherein the stator is arranged to surround the rotor, a first gap is defined between the rotor and the stator, and the stator defines a second gap, the thermal conduction member is disposed between the rotor and the stator to conduct heat in the first gap to the second gap, the second gap is located in the airflow channel, and the airflow flows through the second gap.

4. The angle grinder according to claim 3, wherein the stator comprises a stator core, the stator core comprises a main body and a plurality of teeth extending radially inward from the main body, wherein the plurality of teeth comprise a winding arm connected to the main body, and a winding groove is defined between adjacent winding arms, wherein the winding groove forms the second gap.

5. The angle grinder according to claim 4, wherein the stator further comprises a winding coil and an insulating frame, the insulating frame at least covers the stator core, the winding coil is wound around the insulating frame, at least part of the insulating frame is disposed between the rotor and the stator, and the thermal conduction member is mounted on the portion of the insulating frame between the rotor and the stator.

6. The angle grinder according to claim 5, wherein the thermal conduction member comprises a thermal conduction portion and a mounting portion connected to the thermal conduction portion, the mounting portion is configured for mounting the thermal conduction member on the stator or the insulating frame, the thermal conduction portion extends toward the airflow channel, and at least the thermal conduction portion is made of a thermal conductive material.

7. The angle grinder according to claim 5, wherein the angle grinder further comprises a fan, accommodated in the housing and mounted on the electric motor shaft, wherein the fan is driven by the electric motor shaft to drive the airflow into motion.

8. A blower, comprising:
a housing, which comprises an air inlet and an air outlet;
an electric motor, accommodated in the housing and comprising an electric motor shaft, a stator and a rotor;
wherein the electric motor shaft is coupled to the rotor, and is configured to be driven by the rotor;

a fan, operatively connected to the electric motor shaft and configured to be driven by the electric motor to drive the airflow into motion; and an airflow channel, located inside the housing and defined between the air inlet and the air outlet;

wherein the airflow enters via the air inlet and is discharged through the air outlet and the blower further comprises a thermal conduction member, disposed at least between the rotor and the stator and extending toward the airflow channel, to conduct heat between the rotor and the stator into the airflow channel.

9. The blower according to claim 8, further comprising a seal member disposed in the electric motor and comprising a seal strip axially disposed between the stator and the rotor and/or a seal ring circumferentially disposed between the stator and the rotor.

10. The blower according to claim 8, wherein the stator is arranged to surround the rotor, a first gap is defined between the rotor and the stator, the stator defines a second gap, the thermal conduction member is disposed between the rotor and the stator to conduct heat in the first gap to the second gap, the second gap is located in the airflow channel, and the airflow flows through the second gap.

11. The blower according to claim 10, wherein the stator comprises a stator core, the stator core comprises a main body and a plurality of teeth extending radially inward from the main body, the plurality of teeth comprise a winding arm connected to the main body, a winding groove is defined between adjacent winding arms, and the winding groove forms the second gap.

12. The blower according to claim 11, wherein the stator further comprises an insulating frame and a winding coil, the insulating frame at least partially covers the stator core, the winding coil is wound around the insulating frame, at least part of the insulating frame is disposed between the rotor and the stator, and the thermal conduction member is mounted on the portion of the insulating frame between the rotor and the stator.

13. The blower according to claim 12, wherein the thermal conduction member comprises a thermal conduction portion and a mounting portion connected to the thermal conduction portion, the mounting portion is configured for mounting the thermal conduction member on the stator or the winding coil, the thermal conduction portion extends toward the airflow channel, and at least the thermal conduction portion is made of a thermal conductive material.

14. A power tool, comprising:
a housing, comprising an air inlet and an air outlet;
a tool attachment, configured for implementing the function of the power tool;
an output shaft, configured for supporting the tool attachment;
an electric motor, accommodated in the housing and operatively connected the output shaft to drive the tool attachment to operate, the electric motor comprising an electric motor shaft, a stator and a rotor, wherein the electric motor shaft is operatively connected to the output shaft to drive the output shaft to rotate, and is coupled to and configured to be driven by the rotor; and
an airflow channel, located inside the housing and defined between the air inlet and the air outlet;
wherein airflow enters via the air inlet and is discharged via the air outlet and the power tool further comprises a thermal conduction member, disposed at least between the rotor and the stator and extending toward the airflow channel, to conduct heat between the rotor and the stator into the airflow channel.

15. The power tool according to claim 14, further comprising a seal member disposed in the electric motor and comprising a seal strip axially disposed between the stator and the rotor and/or a seal ring circumferentially disposed between the stator and the rotor.

16. The power tool according to claim 14, wherein the stator is arranged to surround the rotor, a first gap is defined between the rotor and the stator, the stator defines a second gap, the thermal conduction member is disposed between the rotor and the stator to conduct heat in the first gap to the second gap, the second gap is located in the airflow channel, and the airflow flows through the second gap.

17. The power tool according to claim 16, wherein the stator comprises a stator core, the stator core comprises a main body and a plurality of teeth extending radially inward from the main body, the plurality of teeth comprise a winding arm connected to the main body, a winding groove is defined between adjacent winding arms, and the winding groove forms the second gap.

18. The power tool according to claim 17, wherein the stator further comprises an insulating frame and a winding coil, the insulating frame at least partially covers the stator core, the winding coil is wound around the insulating frame, at least part of the insulating frame is disposed between the rotor and the stator, and the thermal conduction member is mounted on the portion of the insulating frame between the rotor and the stator.

19. The power tool according to claim 18, wherein the thermal conduction member comprises a thermal conduction portion and a mounting portion connected to the thermal conduction portion, the mounting portion is configured for mounting the thermal conduction member on the stator or the insulating frame, and at least the thermal conduction portion is made of a thermal conductive material.

20. The power tool according to claim 14, wherein the thermal conduction member is integrally formed.

* * * * *